INVENTOR
WILLIAM J. PATZER
BY
Sughrue, Rothwell, Mion, Zinn & Macpeak
ATTORNEYS

United States Patent Office 3,559,189

Patented Jan. 26, 1971

3,559,189

SERIALIZED REGISTER DATA PROCESSING SYSTEM

William J. Patzer, Apalachin, N.Y., assignor to International Business Machines Corporation, Armonk, N.Y., a corporation of New York Filed May 9, 1968, Ser. No. 728,025
Int. Cl. G06f 7/00
U.S. Cl. 340—172.5 7 Claims

ABSTRACT OF THE DISCLOSURE

A data processing system in which the operand length is an integral multiple of the data flow width. The resultant data flow is serial-by-register, parallel-by-data-flow-width wherein each operand is stored and processed in portions each having a length or number of bits equal to the data flow width, thereby permitting operands to time share the data flow gating circuits so that the required number of logic circuits is significantly reduced.

BACKGROUND OF THE INVENTION

Field of the invention

This invention relates to the field of digital data processing systems.

Description of the prior art

In the past, there have existed both completely parallel and completely serial data processing systems. Less common are combined serial and parallel systems in which operands are longer than the data flow width; however, in such systems the registers holding the operands for the data processing unit, even though they each hold only a portion of the operand, operate in parallel i.e., each register requires its own set of gates for controlling the transfer of a complete operand from the registers to the data processing or arithmetic unit.

SUMMARY OF THE INVENTION

The object of the invention is to provide an improved combined serial-parallel digital data processing system in which each operand has a length of $n$ bits and is an integer multiple $k$ of the data flow width of $n/k$ bits, such a system including a data processing or arithmetic unit and a data bus each having a data flow width of $n/k$ bits. The data flow is serial-by-register and parallel-by-data flow width. The registers associated with the data processing unit each have a width or number of bit positions equal to the data flow width of $n/k$ bits. Data flows through the registers serially so that the registers may time share the gating circuits between the registers and the data processing unit. Economies are realized through reduction of data bus loading, reduction in the number of logic gates, and simplification of sequence controls. The present invention is particularly useful where a very high speed data processing unit is used in conjunction with a relatively low speed memory in which case little time-saving advantage would be realized from a straight parallel data flow system.

DESCRIPTION OF THE PREFERRED EMBODIMENT

Figure 1:
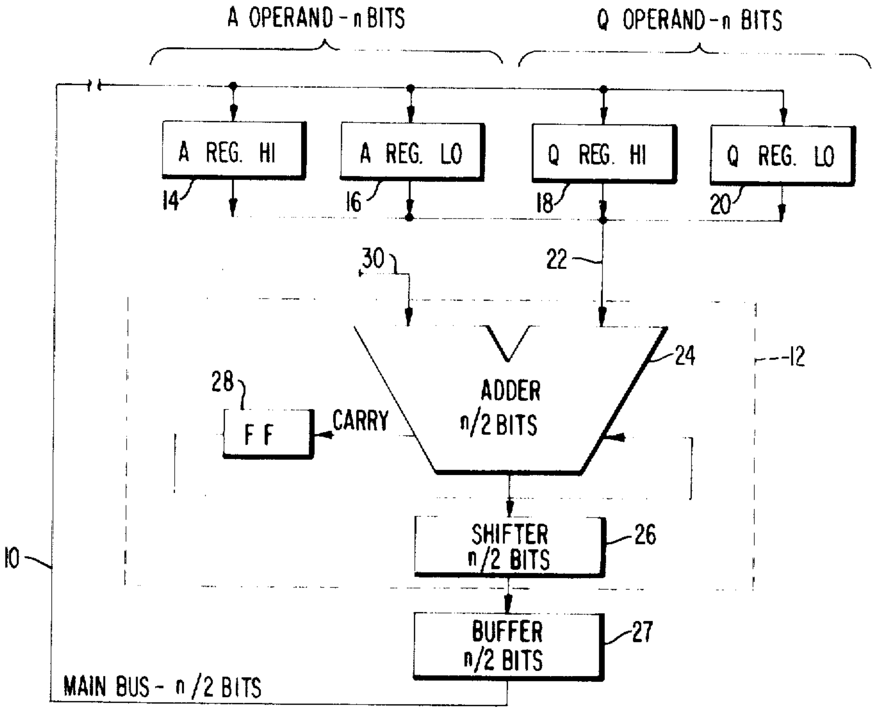
FIG. 1 PRIOR ART
FIG. 1 is a block diagram of a prior art combined serial-parallel data processing system.
Figure 2:
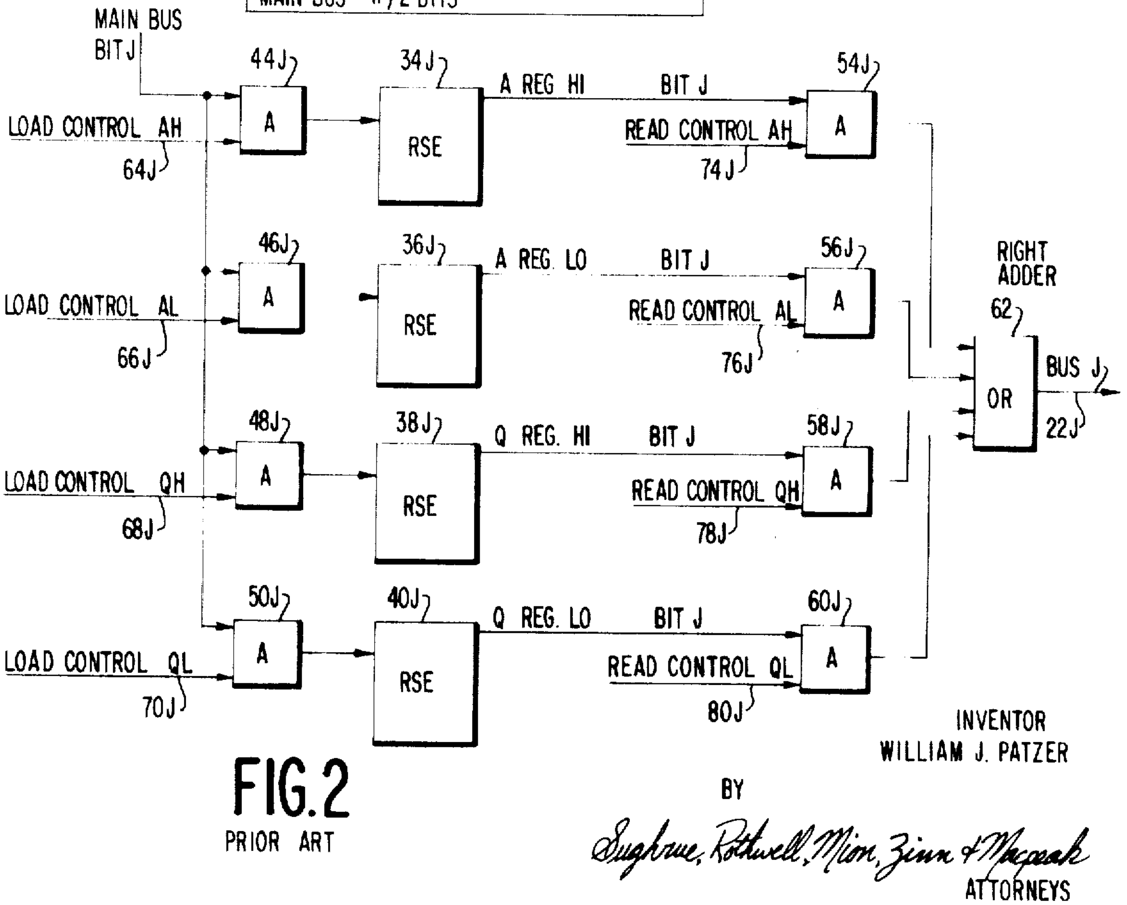
FIG. 2 PRIOR ART
FIG. 2 is a logic diagram illustrating the logic circuits required to gate the registers in the system of FIG. 1.

FIGS. 1 and 2 illustrate one form of a prior art data processing system utilizing combined serial and parallel data transfer. It is assumed that the length of the operands or data words in such a system is $n$ bits but the data flow width is $n/k$ bits and $k=2$ i.e., the main bus 10 connecting the output of the data processing unit 12 to the input of registers 14, 16, 18 and 20 contains $n/2$ conductors so that $n/2$ bits can flow in parallel. Each of registers 14 and 16 has a data flow width of $n/2$ bits i.e., $n/2$ stages, and together they form the A register for storing an A operand. Register 14 is designated as the A REG HI register and register 16 is designated as the A REG LO register. Registers 18 and 20 form the Q register for storing a Q operand. Register 18 is designated the Q REG HI register and the register 20 is designated the Q REG LO register. The $n/2$ bit positions or stages of each of the registers 14, 16 and 18 and 20 are connected in parallel through logic circuits illustrated in FIG. 2 to a right adder bus 22 containing $n/2$ conductors. This bus is connected to the data processing unit 12 which consists of a high speed adder 24, a shifter 26 and a carry flip-flop 28. Both the adder and the shifter have a data flow width of $n/2$ bits. A left adder bus 30 of $n/2$ conductors is connected to another input of adder 24. The output of the shifter is fed through a buffer register 27 to prevent race conditions. Buffer 27 also has a data flow width of $n/2$ bits.

In the operation of FIG. 1 the A and Q operands stored in registers 14, 16, 18 and 20 are read out parallel-by-register and parallel-by-data-flow-width to bus 22 and thence to the input of the data processing unit 12. The result from the data processing unit 12 is also read out parallel-by-data-flow-width to the main bus 10 to the desired one of the registers connected in parallel to the main bus.

FIG. 2 illustrates in more detail the logic circuit for loading one stage or bit position (bit $j$) of the reigsters and for reading the bit $j$ out to the conductor 22$j$ in the bus 22. The bit positions within the data flow width will be designated 1, 2 . . . $j$ . . . $n/2$.

Each register 14, 16, 18 and 20 consists of $n/2$ stages. Each stage includes a register storage element (RSE) which is a flip-flop or latch. The RSE storage elements of registers 14, 16, 18 and 20 corresponding to bit $j$ are designated 34$j$, 36$j$, 38$j$ and 40$j$, respectively. Connected to the inputs of the storage elements are the outputs of corresponding input AND gates 44$j$, 46$j$, 48$j$ and 50$j$. Connected to the outputs of the storage registers are the upper inputs of corresponding readout AND gates 54$j$, 56$j$, 58$j$ and 60$j$ whose outputs are connected through an OR circuit 62 to the conductor 22$j$ in the right adder bus 22.

Register storage element 34$j$ corresponds to bit $j$ in A REG HI register 14, register storage element 36$j$ corresponds to bit $j$ in A REG LO 16, register storage element 38$j$ corresponds to bit $j$ in Q REG HI register 18, and register storage element 40$j$ corresponds to bit $j$ in Q REG LO register 20.

The conductor 10$j$ in main bus 10 is connected in parallel to one input of each of the input AND gates 44$j$, 46$j$, 48$j$ and 50$j$. Each of these AND gates has another input labeled 64$j$, 66$j$, 68$j$ and 70$j$, respectively. Each of these latter inputs is also connected in parallel with the corresponding inputs of the other input AND gates in the same register. That is, there are $n/2$ register storage elements in each of the registers 14, 16, 18 and 20, and there are $n/2$ input AND gates for each register. In like manner, each of the readout AND gates 54$j$, 56$j$, 58$j$ and 60$j$ has a second input 74$j$, 76$j$, 78$j$ and 80$j$, respectively. Each of these second inputs is also connected in parallel with the corresponding second inputs of the other readout AND gates in the same register.

In the operation of FIG. 1 and 2, if it is desired to load the A register with an operand appearing on main bus 10, a LOAD CONTROL AL signal is applied to all of the inputs $66_1$ . . . $66_j$ . . . $66_{n/2}$ to open the input gates 46 and load the first $n/2$ bits on bus 10 into A REG LO 16. Then all of the inputs $64_1$ . . . $64_j$ . . . $64_{n/2}$ are energized by a LOAD CONTROL AH signal to open input gates 44 and load the second half of the operand on bus 10 into A REG HI register 14. If the output of the data processing unit 12 is to be loaded into the Q registers 18 and 20, then in a similar manner, a signal LOAD CONTROL QL is applied to the inputs $70_1$ . . . $70_j$ and $70_{n/2}$, and then the signal LOAD CONTROL QH is applied to the inputs $68_1$ . . . $68_j$ . . . $68_{n/2}$.

Similarly, control signals are applied to the read out gates 54, 56, 58 and 60 to read out the contents of the registers 14, 16, 18 and 20 to the right adder bus 22. To read out the A REG LO register 16 to the bus, a signal READ CONTROL AL is applied to the $76_1$ . . . $76_j$ . . . $76_{n/2}$ inputs of the AND gates 56, followed by a signal READ CONTROL AH to the inputs $74_1$ . . . $74_j$ . . . $74_{n/2}$.

It is important to note that the prior art organization shown in FIGS. 1 and 2 requires one input gate and one output gate for each position in each of the registers, or more specifically, eight AND gates are required per bit of the data flow width for the four register system illustrated. In more generalized form, the total number of AND gates is equal to twice the operand length multiplied by the number of operands which are to be retained at the same time e.g., this number is 2 in the illustrated system since registers are provided for simultaneously retaining an A operand and a Q operand. Therefore, the total number of AND gates required for the prior art system when the operand length $n$ is 16 bits is $2\times16\times2$ or 64. Note that the number of AND gates required is not dependent upon the data flow width $n/k$. By comparison, the improved data processing system of the present invention requires only two output AND gates per bit of data flow width for the same basic two operand system. In more generalized form, the number of gates required in the improved system is the sum of the number of operands to be simultaneously retained multiplied by the data flow width $n/k$. Therefore, for the improved system when the operand length $n$ is 16, the total number of AND gates required is (2) 16/2 or 16. Also note that the required number of AND gates is reduced as the data flow width is reduced.

Figure 3:
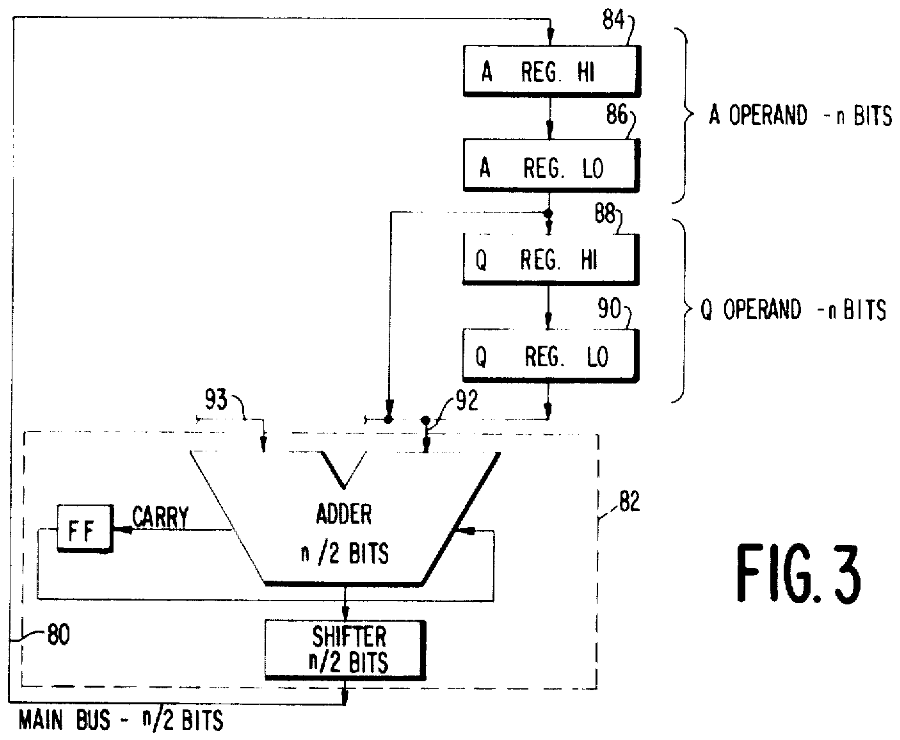
FIG. 3 is a block diagram of the improved serialized register data processing system of the present invention.
Figure 4:
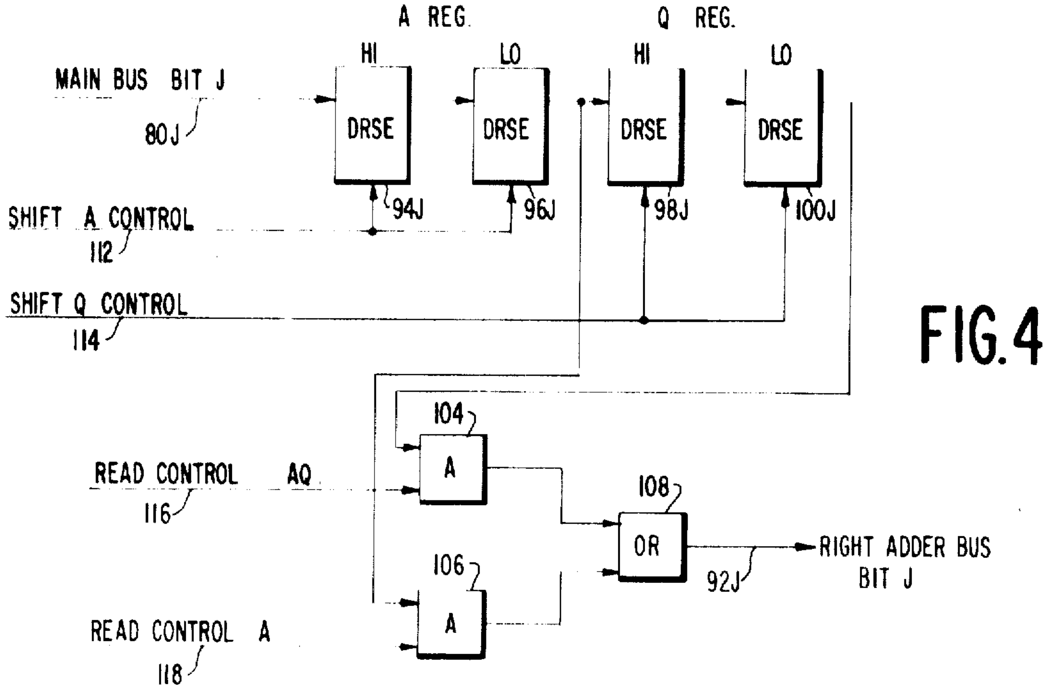
FIG. 4 is a logic diagram illustrating the logic circuits used to gate the registers in the present invention.
Figure 5:
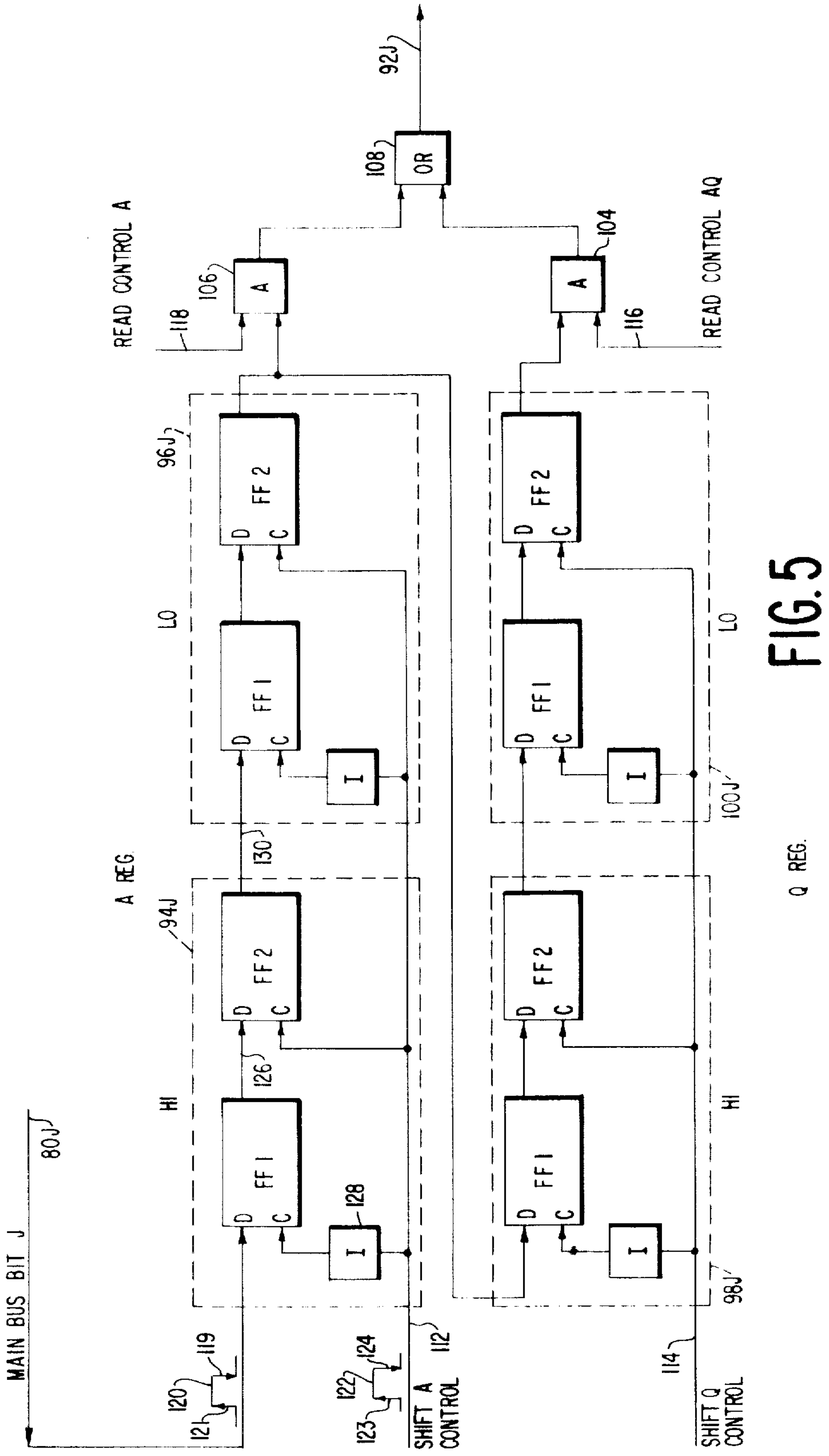
FIG. 5 is a circuit diagram of one type of delayed flip-flop which may be used as a storage element in the registers of the present invention.

The improved system of this invention is illustrated generally by the block diagram in FIG. 3. FIG. 4 illustrates the gating logic, and FIG. 5 illustrates one form of delay register storage element (DRSE) which is used in the registers of the invention. The DRSE per se is not part of the invention and may be any double ranked flip-flop suitable for shift register use without additional gating or storage elements.

In the preferred embodiment of the invention illustrated in FIG. 3, we will again assume that the operand length is $n$ bits and the data flow width of the portion of the data processing system under consideration is $n/2$ bits, i.e., $k=2$. Other portions of an associated computer may have different data flow widths. FIG. 3 is identical to FIG. 1 with the exception of the rearrangement of the operand registers to provide transfer of operands serially by register and parallel by data flow width. The data processing or arithmetic unit 82 is identical to the data processing unti 12 of FIG. 1; however, the buffer 27 is not required. The output of the data processing unit is connected via an $n/2$ conductor main bus 80 to the input of a register 84 designated A REG HI whose output is connected to the input of register 86 designated A REG LO. The output of register 86 is connected via an $n/2$ conductor bus to the right adder bus 92 and also to the input of a register 88 designated as Q REG HI whose output in turn is connected to the input of a register 90 designated Q REG LO whose output is also connected to the bus 92. The data processing unit 82 as well as the buses 80 and 92 and the registers 84, 86, 88 and 90 all have a data flow width of one half the operand length i.e., $n/2$ bits. However, it is to be understood that the data flow width may be $n/k$ where $k$ is any integer, in which case each of the operand registers, such as the A register and the Q register, will be divided into $k$ serially connected registers, each having a number of stages or data flow width of $n/k$.

In the operation of FIG. 3, the output of the data processing unit 82 appearing on bus 80 is loaded $n/2$ bits at a time in parallel to the input of the A REG HI register 84 and then to A REG LO register 86. Depending upon the gating controls illustrated in FIG. 4, the operand may then be read out directly to the adder bus 92 or else in two more iterations loaded into registers 88 and 90 and from there to the adder bus 92. In many applications of this embodiment, after the registers 84, 86, 88 and 90 are loaded, succeeding iterations gate either register 86 or 90 to bus 92 and simultaneously gate new results from the data processing unit into register 84. A left adder bus 93 may be connected to other portions of an associated computer system or even to the A or Q registers.

FIG. 4 is a logic diagram showing the manner in which one bit i.e., bit $j$ of the operand is processed in the improved system, and clearly illustrates the reduction in gating circuits required as compared to the prior art system of FIG. 2. In this case, each register consists of $n/2$ stages of delay register storage elements, such as a delayed flip-flop or other binary capable of shift register use without additional storage. One form of DRSE is illustrated in FIG. 5 and is available as an integrated circuit with at least two DRSE on a single chip.

The $j$ stage or bit of register 84 is designated as 94$j$, the $j$ stage of register 86 as 96$j$, the $j$ stage of register 88 as 98$j$, and the $j$ stage of register 90 as 100$j$. The conductor 80$j$ of the main bus 80 is connected to the input of DRSE 94$j$. The output of DRSE 94$j$ is connected to the input of DRSE 96$j$ whose output is connected to the input of storage element 98$j$ whose output in turn is connected to the input of DRSE 100$j$. There are only two output AND gates labeled 104 and 106 whose outputs are connected through an OR circuit 108 to the conductor 92$j$ of bus 92. The output of DRSE 96$j$ is also connected to one input of AND gate 106, and the output of DRSE 100$j$ is connected to one input of AND gate 104. The elements illustrated in FIG. 4 are duplicated for each bit of a data flow width $n/k$, where $k$ equals 2 in the illustrated embodiment. The output of each of the $n/2$ OR circuits is connected to the corresponding bit conductor in the right adder bus 92.

A shift control conductor 112 is connected in parallel to each of the storage elements 94$j$ and 96$j$, and a shift control conductor 114 is connected in parallel to the storage elements 98$j$ and 100$j$. Furthermore, a conductor 116 is connected to a second input of AND gate 104 and a conductor 118 is connected to a second input of AND gate 106.

In the operation of FIG. 4, if it is desired to load the A registers 84 and 86 with the output of data processing unit 82 appearing on main bus 80, a SHIFT A CONTROL signal is applied to shift conductor 112. The bit in DRSE 94$j$ is transferred to DRSE 96$j$ simultaneously with the loading of the bit on conductor 80$j$ into DRSE 94$j$. This places the low order half of the operand in the A REG HI register 84. However, upon the next occurrence of a SHIFT A CONTROL signal, bit *j* of the low order half of the operand is transferred to DRSE 96*j* followed by loading of DRSE 94*j* with the *j* bit of the high order half of the operand.

If a READ CONTROL A signal is also applied to input 118 of AND gate 106, then the *j* bit is shifted out of DRSE 96*j* and transferred through the open AND gate 106 and OR gate 108 to the right adder bus conductor 92*j*. If SHIFT Q CONTROL pulses are applied to conductor 114, then the contents of DRSE 96*j* are transferred serially into DRSE 98*j* and 100*j* in the Q register instead of directly to bus 92*j*. Furthermore, if a READ CONTROL AQ signal is applied to input 116 of AND gate 104, the contents of DRSE 100*j* are transferred by the SHIFT Q CONTROL pulses through AND gate 104 and OR circuit 108 to the adder bus conductor 92*j*.

FIG. 5 illustrates one form of the delayed register storage elements DRSE which are utilized in this invention. The delay is required in the serialized register organization of this invention in order for a single shift pulse to transfer a bit out of the element before a new bit appearing on the input of the element is made available at the output of the element. All the DRSE's are identical to each other. Let us look at DRSE 94*j*. It consists of a first flip-flop FF1 and a second flip-flop FF2. We will again consider only bit position *j* of an operand. Assume that a bit appearing on conductor 80*j* of main bus 80 appears as a pulse 120. Flip-flop FF1 is designed to assume the state of the signal applied to its data D input during the positive or up level of a pulse applied to its clock C input. An inverter 128 is connected between the clock C input and shift control conductor 112. The SHIFT A CONTROL signal is represented by a pulse 122. Note that the positive transition 121 of pulse 120 representing a binary 1 precedes in time the positive transition 123 of pulse 122. Also, the negative transition 119 of pulse 120 follows the positive transition 123 of pulse 122. If a binary 0 is to be read from the main bus for bit position *j*, pulse 120 will not occur; i.e., the signal on conductor 80*j* is down. A second positive transition on line 112 must not occur until the next pulse on conductor 80*j* of the main bus is stable.

In operation, bit *j*, represented by the up or positive level of pulse 120, combined with the down level of the SHIFT A CONTROL pulse acting through the inverter 128 sets FF1, thereby causing positive transition on line 126. Positive transition 123 of pulse 122 has no effect on FF1 because of inverter 128 and the stability of pulse 120 during transition 123, but since it is applied to the clock C terminal of FF2, it does gate FF1 to FF2, causing a positive transition on line 130 if FF2 were originally in its reset state. Consequently, bit *j* is available at the output of DRSE 94*j* by virtue of the fact that FF2 follows the state of FF1 upon the positive transition 123 of pulse 122. After pulse 122 has risen, i.e., after the positive transition 123, the negative transition 119 of pulse 120 can occur with no effect. Of course, the negative transition 124 appearing on the clock C terminal of FF2 has no effect on FF2. A positive level on line 130 will have no effect on FF1 in DRSE 96*j* until SHIFT A CONTROL pulse 122 on line 112 is down again. The negative transition 124 of pulse 122 is inverted to a positive transition by inverter 128 to allow new data to enter FF1 in DRSE 94*j* and to allow the data on the output of FF2 in DRSE 94*j* to be set into FF1 of DRSE 96*j*.

The operation of the other DRSE's is identical to that of DRSE 94*j*. The phase relationship between the pulse on the input of each DRSE and either a SHIFT A CONTROL or SHIFT Q CONTROL pulse is the same as that between pulses 120 and 122 so that the bit in each FF2 is shifted out before a new bit is loaded into the FF2 to be available at the output of the DRSE.

Table 1 shows the increased economics realized by the improved system of the invention as compared to the prior system illustrated in FIGS. 1 and 2.

TABLE 1

| | Prior art (Fig. 2) | Invention (Fig. 4) | Increase in economies, percent |
|---|---|---|---|
| No. of main bus loads | 4 | 1 | 75 |
| No. of LOAD CONTROLS | 4 | 2 | |
| No. of READ CONTROLS | 4 | 2 | |
| Total controls | 8 | 4 | 50.0 |
| No. of AND gates | 8 | 2 | |
| No. of OR gates | 1 | 1 | |
| Total gates | 9 | 3 | 66.6 |

Although the example assumes an integral multiple relationship between operand length and data flow widths, this is not a necessary condition. Operands not an integral multiple of the data flow width may be padded with high order zeros or repeated signs to obtain an integral multiple. The operands typically consist of, but are not limited to, the instruction address, operand address, arithmetic/logic operands, and accumulated and intermediate results. As the number of operands is increased, the number of registers in any stack increases thereby increasing the number of AND gates connected to the common OR circuit 108. Furthermore, separate stacks may be added to the system in which event the added stacks may be coupled to separate input buses and output buses, or alternatively may share a common output bus with other stacks by coupling the corresponding output AND gate connected to the common OR circuit 108.

While the invention has been particularly shown and described with reference to a preferred embodiment thereof, it will be understood by those skilled in the art that various changes in form and details may be made therein without departing from the spirit and scope of the invention.

I claim:

1. In a data processing system in which each operand has a length of $n$ bits and is an integer multiple $k$ of the data flow width of $n/k$ bits, where $k$ is greater than 1, and including a data processing unit having a data flow width of $n/k$ bits where $n/k$ is greater than 1, the improvement comprising:

(a) a first set of $k$ registers coupled in series and each having a data flow width of $n/k$ bits, where the $k$th register is the last register in the set and (b) means for transferring operands between said data processing unit and said registers so that the transferred data always flows serial-by-register and parallel-by-said data flow width.

2. The improved data processing system as defined in claim 1 further comprising:

(a) a first bus having a data flow width of $n/k$ bits and connected between the output of said data processing unit and the input of the first register of said first set, (b) a second bus connected to the input of said data processing unit and having a data flow width of $n/k$ bits, (c) means coupling the output of the $k$th register of said first set to said second bus, and (d) means for applying a single shift control signal to all of said registers, whereby the contents of said $k$th register are transferred to said second bus, the contents of each of the other registers are transferred to the next following register, and operand bits on said first bus are transferred into said first register.

3. The improved data processing system as defined in claim 2 wherein each of said registers comprises $n/k$ delay register storage elements, each capable, in response to the application thereto of a bit signal and said shift control signal, of transferring its contents before accepting said bit signal for storage therein.

4. The improved data processing system as defined in claim 3 further comprising:

(a) an AND gate connected between the output of said $k$th register and said second bus, and (b) means for applying a read signal to said AND gate to permit the contents of said registers to pass therethrough to said second bus in response to successive shift control signals applied to said storage elements.

5. In a data processing system in which each operand has a length of $n$ bits and is an integer multiple $k$ of the data flow width of $n/k$ bits, where $k$ is greater than 1, and including a data processing unit having a data flow width of $n/k$ bits wherein $n/k$ is greater than 1, the improvement comprising:

(a) a first set of $k$ registers coupled in series and each having a data flow width of $n/k$ bits, where the $k$th register is the last register in the set, (b) a first bus having a data flow width of $n/k$ bits and connected between the output of said data processing unit and the input of the first register of said first set, (c) one or more sequentially arranged additional sets of $k$ serially coupled registers each, each register having a data flow width of $n/k$ bits, and the $k$th register being the last register in each set, (d) a second bus connected to the input of said data processing unit and having a data flow width of $n/k$ bits, (e) means coupling the output of the $k$th register of each set to said second bus, (f) means coupling the output of the $k$th register of each set except the last set to the input of the first register of the next following set, (g) means for transferring operands between said data processing unit and said registers so that the transferred data always flows serial-by-register and parallel-by-said data flow width, and (h) means for applying shift control signal to said first set of registers and to selected additional sets of said registers in sequence with said first set, whereby the contents of the $k$th register of the last selected set in the sequence are transferred to said second bus, the contents of the $k$th register of said first and each of the other selected sets are transferred to the first register of the next following set, the contents of each register except the $k$th register in each set are transferred to the next following register in the set, and operand bits on said first bus are transferred to the first register of said first set.

6. The improved data processing system as defined in claim 1 wherein the first register in said set is the higher or highest order register and the $k$th register is the lower or lowest order register, and wherein said transferring means comprises means for transferring operands from said data processing unit to said registers and from said registers to said data processing unit with the lower or lowest order group of $n/k$ bits preceding the higher order group of $n/k$ bits of each operand.

7. In a data processing system including a data processing unit and operand storage registers and in which the operand length $n$ is an integer multiple $k$ of the data flow width $n/k$, said data processing unit having a data flow width of $n/k$, a method of reducing the number of logic gates required in such a system comprising:

(a) coupling in series a first set of $k$ registers each having a data flow width of $n/k$ bits, the $k$th register being the last register in the set, (b) coupling the output of the $k$th register to the input of said data processing unit, (c) coupling the output of said data processing unit to the input of the first register in said set, and (d) transferring operands from said $k$th register to said data processing unit and from data processing unit to the first register of said set, so that the data always flows serial-by-register and parallel-by-said data flow width.

References Cited

UNITED STATES PATENTS 3,153,776 10/1964 Schwartz ---------- 340—172.5

OTHER REFERENCES

IBM 7080 Reference Manual, December 1961, Form A22-6560-1, pp. 9, 10, 25-27.

PAUL J. HENON, Primary Examiner

R. F. CHAPURAN, Assistant Examiner